Figure 1:
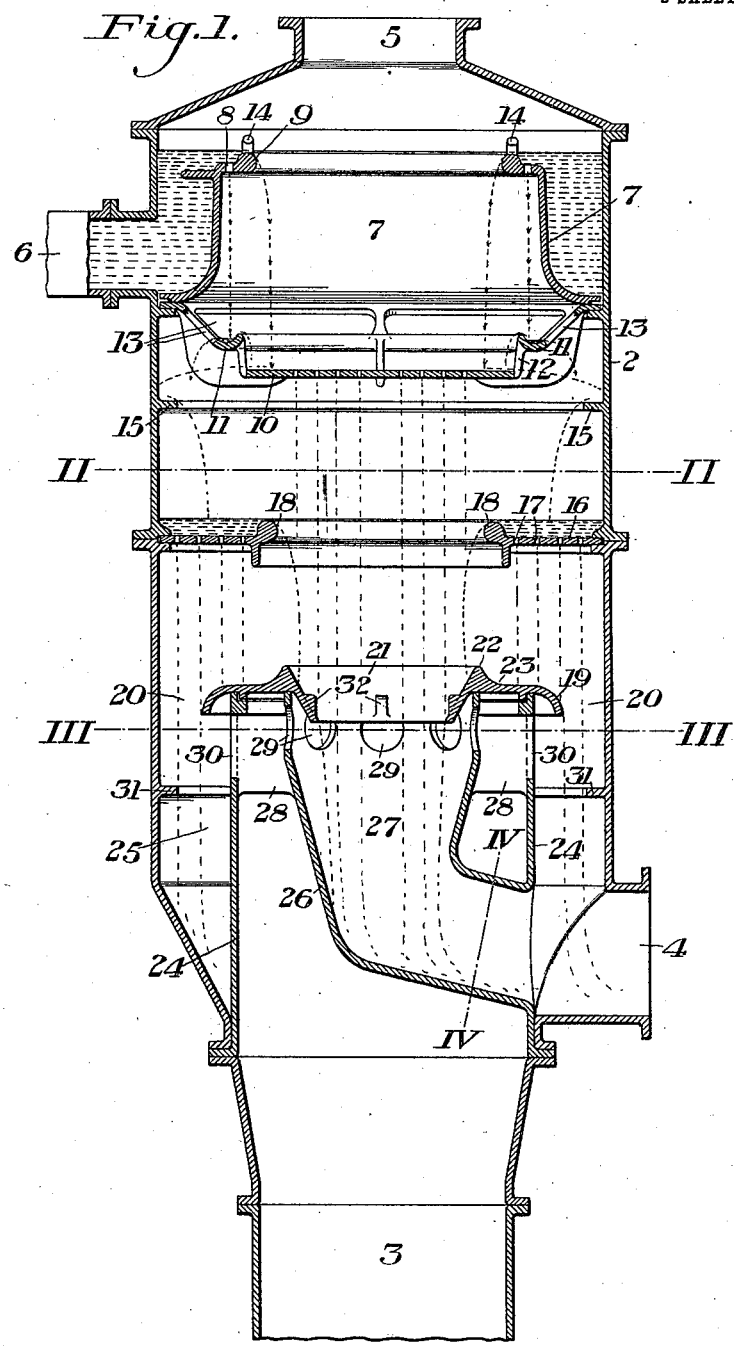

C. L. W. TRINKS.
BAROMETRIC CONDENSER.
APPLICATION FILED OCT. 10, 1911.

1,028,157.

Patented June 4, 1912.

2 SHEETS—SHEET 1.

WITNESSES
R. A. Balderson
G. B. Fleming

INVENTOR
C. L. W. Trinks,
by Bakewell, Byrnes & Parmelee,
attys.

C. L. W. TRINKS.
BAROMETRIC CONDENSER.
APPLICATION FILED OCT. 10, 1911.
1,028,157.
Patented June 4, 1912.
2 SHEETS—SHEET 2.
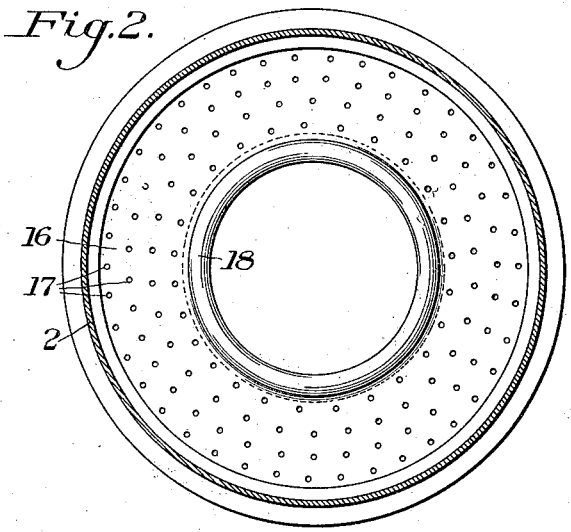
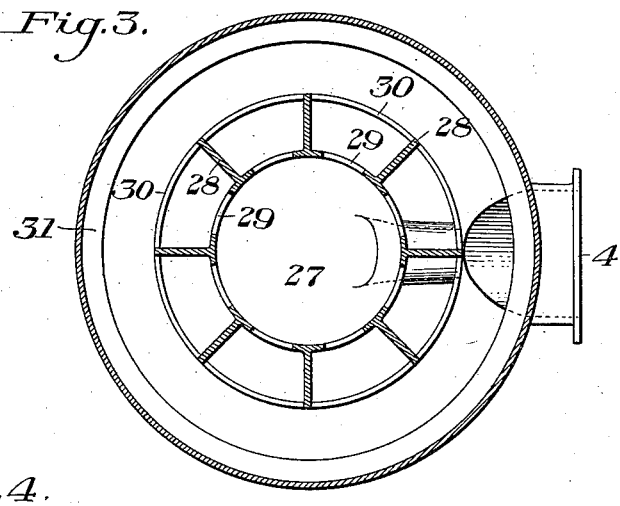
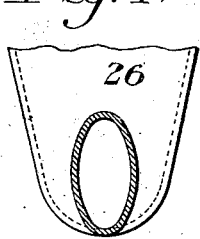
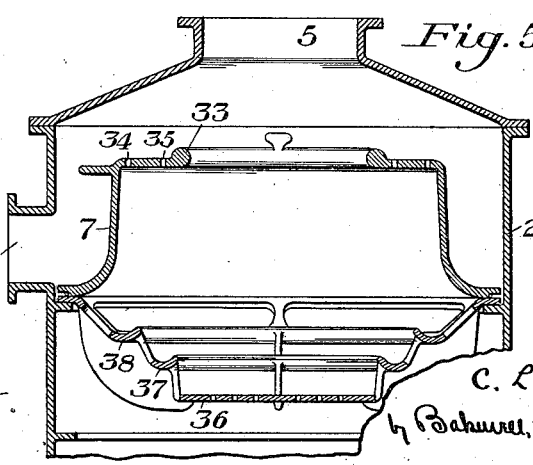

UNITED STATES PATENT OFFICE.

CHARLES L. W. TRINKS, OF PITTSBURGH, PENNSYLVANIA.

BAROMETRIC CONDENSER.

1,028,157.   Specification of Letters Patent.   Patented June 4, 1912.

Application filed October 10, 1911. Serial No. 653,898.

*To all whom it may concern:*

Be it known that I, CHARLES L. W. TRINKS, a resident of Pittsburgh, in the county of Allegheny and State of Pennsylvania, have invented a new and useful Improvement in Barometric Condensers, of which the following is a full, clear, and exact description, reference being had to the accompanying drawings, forming part of this specification, in which—

Figure 1 is a vertical section of a condenser embodying my invention, with the tail pipe broken away; Figs. 2 and 3 are sections on the lines II—II and III—III, respectively, of Fig. 1; Fig. 4 is a detail sectional view on the line IV—IV of Fig. 1; and Fig. 5 is a vertical section of a portion of the condenser showing a modification.

My invention has relation to barometric condensers of the countercurrent type, and is designed to provide means of improved character for effecting a thorough separation of the air from the cooling water and also to provide for a thorough mixing of the steam and water. I also preferably construct the condenser in such a manner that it is supported on the steam pipe.

The precise nature of the invention will be best understood by reference to the accompanying drawings, which will now be described, it being premised, however, that various changes may be made in the details of construction and arrangement of the parts by those skilled in the art, without departing from the spirit and scope of my invention, as defined in the appended claims.

In these drawings, the numeral 2 designates the condenser vessel which is shown as supported on the steam pipe 3, which opens upwardly through the bottom of the vessel.

4 designates the water outlet leading to the usual tail pipe (not shown).

5 is the exhaust connection at the top of the vessel, and 6 the water inlet which is located at one side near the top.

Placed in the upper portion of the vessel adjacent to the water inlet is a hollow baffle or weir 7, having the two concentric overflows 8 and 9, the overflow 8 being formed by slots in an inwardly turned flange, and the overflow 9 being formed by the rounded edge of said flange. The overflow edge 9 is rounded by a curve of large radius for the purpose of making the fall of water thereover take substantially a cylindrical form instead of forming a converging cone.

Placed below the weir 7 is a splash plate having a central horizontal overflow portion 10, upon which the water flowing over the edge falls, and also having at a higher level a splash portion 11, which receives the water falling through the overflow 8. The two splash portions 10 and 11 are separated by the lateral openings 12, and the splash plate also has lateral openings 13 above the splash portion 11. By the construction and arrangement of this splash plate, it will be seen that each of the concentric sheets or cascades of water is deflected outwardly against the walls of the vessel 2 in the manner indicated in dotted lines, without interference with each other. Owing to the splashing action of this splash plate, a large percentage of the air contained in the water will be liberated and removed. It is important that an unobstructed upward passage be afforded for this air, so that the air outside of the cascades can flow therethrough to the central space and thence to the air exhaust connection 5. To this end, I provide lugs or projections 14 on the overflow edge 9. These lugs or projections act to break up the continuity of the sheet or cascade, leaving free openings through which the air can pass. I preferably make these lugs wider at the top than at the bottom, as shown in Fig. 5, since by such construction, the break in the sheet of water will become wider as the flow over the edge 9 increases and as more air has to be removed. The ribs which separate the individual openings of the two series of openings 12 and 13 also act as separators to permit air to flow freely back through said openings.

A short distance below the splash plate, I provide the interior of the vessel with a reverting flange 15, the purpose of which is to prevent the water deflected by the splash plate against the inner wall of the vessel from hugging such wall. This flange acts, as will be seen by the dotted lines in Fig. 1, to throw such deflected water back toward the interior of the chamber.

16 is an annular baffle plate located below the reverting ring 15, and having perforations 17 in its bottom and also having an inner overflow edge 18, which is also preferably rounded by a curve of large radius, so as to prevent a converging fall of the sheet of water thereover.

Placed below the baffle plate 16 is another splash plate 19. This splash plate is centrally located within the condensing chamber with a free annular space 20, surrounding its outer edge, and has therethrough a central opening 21, with downwardly converging walls. The upper edge of this opening forms a sharp ridge 22, the purpose of which is to separate the flow of water into two portions, one portion flowing through said opening, and the other portion flowing down the curved upper surface 23 and through the space 20. Placed below this splash plate is a vertical cylinder 24, which is separated from the wall of the vessel by the space 25, communicating with the water outlet 4, and which has also an inner wall 26, inclosing a space 27, communicating with the opening 21 through the splash plate 19. The lower portion of the inner wall 26 is contracted into pipe form, preferably oval in cross section, as shown in Fig. 4, so as to offer a minimum resistance to the upflow of steam. The inner and outer walls of the cylinder 24 are separated at their upper portions by a series of radial ribs 28, and the inner wall has intermediate of these ribs openings 29, which register with openings 30, in the outer wall, the latter communicating with the upper portion of the space 25.

31 designates a reverting flange which is placed a short distance below the splash plate 19.

As above stated, the splash plate 19 acts to separate the flow of water into two portions, one portion falling through said plate into the space 27 and meeting the steam which is entering through the openings 29, and the other portion falling outside of the cylinder 24 and meeting the steam which is flowing upwardly from the pipe 3 and is entering the condenser through the ports or openings 30. The shape of the splash plate 19 is such that it prevents any water coming into the steam pipe, all the water flowing either into the space 25 or the space 27. The shape of the plate 19 is such as to tend to preserve a high velocity of water, so that it will leave the said plate in the form of thin sheets. The area of water presented to the incoming steam is therefore very large, and the arrangements of the ports in the cylinder 24 and the inner cone portion 26 offers a very large opening to the steam, much larger than could be obtained if either one of these ports alone were employed. One or more lugs or projections 32 are provided on the splash plate 19 to break the continuity of the sheets of water and allow part of the steam to pass into the space between the plates 18 and 19, where all except a very small portion is condensed. The reverting ring 31 causes the water which runs along the walls of the vessel to be broken up shortly before it leaves the condenser, for the purpose of causing it to absorb all the heat possible before it passes out. The water falling into the cone-shaped space 27 passes through the outlet 4 and into the usual barometric tail pipe.

Fig. 5 shows a modification of my invention, in which, instead of producing two concentric sheets or cascades of water at the upper overflow, I provide for three concentric sheets or cascades. One of these is produced by the rounded edge 33 of large radius, and the other two by the concentric slots 34 and 35. The splash plate placed below these overflows is provided with the three splash portions 36, 37 and 38. It will be readily understood that I can in this manner provide for any desired number of concentric sheets or cascades of the falling water in the upper portion of the condenser chamber.

The advantages of my invention result from the novel arrangement of overflows, baffles, splash plates and adjacent parts, so as to provide for a very thorough mixing of the water and steam, and also for the effective separation of the air carried by the water before the latter comes in contact with the steam.

I claim:

1. In a barometric condenser of the countercurrent type, a condensing vessel, a central steam pipe leading into the bottom of said vessel and supporting the same, said pipe having steam discharge ports or openings for the steam to flow into the condensing chamber both radially inward and radially outward, substantially as described.

2. In a barometric condenser of the countercurrent type, a double-walled steam admission pipe having steam ports in both its inner and outer walls, together with a baffle member arranged to throw water in front of both sets of ports, substantially as described.

3. In a barometric condenser of the countercurrent type, a double-walled steam admission pipe having steam ports in both its inner and outer walls, together with a baffle member arranged to throw water in front of both sets of ports in proportion to the area of said ports, substantially as described.

4. In a barometric condenser of the counter-current type, a water baffle or weir having a plurality of concentric annular water discharges, and separate shallow striking members located in different planes below the respective discharges; substantially as described.

5. In a barometric condenser of the counter-current type, a water baffle or weir having a plurality of concentric annular water discharges, and separate shallow striking members vertically under the several discharges, said members being located in different horizontal planes and acting to splash water radially outwardly therefrom; substantially as described.

6. In a barometric condenser of the countercurrent type, a weir or baffle having a separating lug or projection, said lug or projection being of increasing width from its lower toward its upper end, substantially as described.

7. In a barometric condenser of the countercurrent type, the combination with means in the upper portion of the condensing chamber for producing concentric falling sheets or cascades of water, and a concentric splash plate arranged to receive each of the falling sheets or cascades, of a baffle below the splash plate having a central overflow and a plurality of surrounding discharge openings, a steam admission pipe entering the lower portion of the chamber and having inner and outer walls, each of said walls having steam discharge ports therein, and a splash plate or baffle arranged to discharge water adjacent to each of said ports, substantially as described.

8. In a barometric condenser of the countercurrent type, a steam admission pipe having an outer cylindrical portion with ports leading outwardly therethrough into the condensing space, and an inner conical portion having ports leading inwardly therethrough into a contained condensing space, and means for discharging water exteriorly of the cylinder and interiorly of the cone, substantially as described.

In testimony whereof, I have hereunto set my hand.

CHARLES L. W. TRINKS.

Witnesses:
JESSE B. HELLER,
GEO. H. PARMELEE.

Copies of this patent may be obtained for five cents each, by addressing the "Commissioner of Patents, Washington, D. C."